United States Patent
Hill et al.

(10) Patent No.: US 10,378,606 B2
(45) Date of Patent: Aug. 13, 2019

(54) SELECTIVELY TUNABLE VIBRATION ABSORBER FOR A VEHICLE

(71) Applicant: GM GLOBAL TECHNOLOGY OPERATIONS LLC, Detroit, MI (US)

(72) Inventors: Wallace J. Hill, Commerce Township, MI (US); Mark A. Gehringer, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 15/638,948

(22) Filed: Jun. 30, 2017

(65) Prior Publication Data

US 2019/0003547 A1   Jan. 3, 2019

(51) Int. Cl.
*F16F 7/10* (2006.01)
*F16F 15/02* (2006.01)
*G05D 19/00* (2006.01)

(52) U.S. Cl.
CPC ............ *F16F 7/1005* (2013.01); *F16F 15/02* (2013.01); *G05D 19/00* (2013.01); *F16F 2224/025* (2013.01)

(58) Field of Classification Search
CPC .... F16F 7/1005; F16F 15/02; F16F 2224/025; G05D 19/00

USPC .................................................. 188/379–381
See application file for complete search history.

(56) References Cited

U.S. PATENT DOCUMENTS

| | | | | |
|---|---|---|---|---|
| 5,156,380 A * | 10/1992 | Cerruti | ..................... | F16F 7/108 188/378 |
| 5,433,422 A * | 7/1995 | Ross | ........................ | F16F 7/108 188/379 |
| 5,884,902 A * | 3/1999 | Hamada | .................. | F16F 7/108 180/381 |
| 6,321,890 B1 * | 11/2001 | Suzuki | .................. | B60K 5/1208 188/379 |
| 6,854,721 B2 * | 2/2005 | Kato | ........................ | F16F 7/108 188/380 |
| 7,758,027 B2 * | 7/2010 | Yama | ......................... | F16F 7/08 188/380 |
| 8,323,118 B2 * | 12/2012 | Ikeda | ................... | F16F 15/1442 188/380 |
| 2016/0169314 A1 * | 6/2016 | Choi | ........................ | F16F 7/108 188/380 |

\* cited by examiner

*Primary Examiner* — Melanie Torres Williams
(74) *Attorney, Agent, or Firm* — Cantor Colburn LLP

(57) ABSTRACT

A selectively tunable vibration absorber includes a support member having an outer surface, and a selectively tunable element mounted relative to the outer surface of the support member. The selectively tunable element is selectively adjustable to attenuate vibrations in a selected frequency range perceived by the support member in a selected direction. A mass is supported by the selectively tunable element.

14 Claims, 3 Drawing Sheets

SELECTIVELY TUNABLE VIBRATION ABSORBER FOR A VEHICLE

INTRODUCTION

The subject disclosure relates to the art of vehicles and, more particularly, to a selectively tunable vibration absorber for a vehicle.

Mechanical systems may be subjected to vibration during operation. In particular, mechanical systems that employ rotating components such as engines, or that include rotating gears, such as vehicles and the like, may be subjected to various vibrational frequencies. For example, vehicles typically include a prime mover that may take the form of an electric motor, a hybrid motor, or an internal combustion motor. The prime mover, in operation, may produce vibrations at one or more first frequencies.

The prime mover typically provides power to a transmission. The transmission, in turn, transfers power from the prime mover to, for example, a drive shaft and a differential assembly. Each of the transmission and the differential assembly may include one or more gears which, when rotated, may produce vibrations at one or more second frequencies. The one or more second frequencies may be in a significantly different range as compared to the one or more first frequencies. The vibrations produced by the mechanical system may generate undesirable noise and or lead to premature fatigue of associated components.

Vehicles may include a single tuned vibration absorber (TVA) that may be adjusted to mitigate one of the one or more first frequencies, or the one or more second frequencies. Incorporating multiple TVA's into a vehicle, that are tuned to mitigate both the one or more first frequencies and the one or more second frequencies, is not practical due to packaging concerns. There is simply not enough available space to add multiple TVA's. Accordingly, it is desirable to provide for a TVA system having a package size that is similar to existing systems but that may be tuned to mitigate multiple frequencies of interest.

SUMMARY

In accordance with an aspect of an exemplary embodiment, a selectively tunable vibration absorber includes a support member having an outer surface, and a selectively tunable element mounted relative to the outer surface of the support member. The selectively tunable element is selectively adjustable to attenuate vibrations in a selected frequency range perceived by the support member in a selected direction. A mass is supported by the selectively tunable element.

In addition to one or more of the features described above or below, or as an alternative, further embodiments could include wherein the selectively tunable member is formed from an elastomeric material.

In addition to one or more of the features described above or below, or as an alternative, further embodiments could include wherein the selectively tunable element includes a body having substantially circular cross-section having a central void, a first tuning feature is formed in the body radially spaced from the central void in a first direction and a second tuning feature is formed in the body radially spaced from the central void in a second direction, the second direction being substantially opposite of the first direction.

In addition to one or more of the features described above or below, or as an alternative, further embodiments could include wherein the first tuning feature comprises a first void formed in the body and the second tuning feature comprises a second void formed in the body.

In addition to one or more of the features described above or below, or as an alternative, further embodiments could include wherein the support member includes an inner surface defining a passage receptive of a mechanical fastener.

In addition to one or more of the features described above or below, or as an alternative, further embodiments could include another selectively tunable element mounted relative to the outer surface of the support member. The another selectively tunable element is selectively adjustable to attenuate vibrations in another selected frequency range perceived by the support member in another selected direction, another mass supported by the another selectively tunable element.

In addition to one or more of the features described above or below, or as an alternative, further embodiments could include wherein the another selected direction is distinct from the selected direction.

In addition to one or more of the features described above or below, or as an alternative, further embodiments could include wherein the selectively tunable element defines a first selectively tunable module and the another selectively tunable element defines a second selectively tunable tuning module.

In addition to one or more of the features described above or below, or as an alternative, further embodiments could include wherein the first selectively tunable module defines a high frequency absorbing module attenuating frequencies in a range between about 200 hz and about 800 hz, and the second selectively tunable module defines a low frequency absorbing module attenuating frequencies in a range between about 20 hz and about 200 hz.

In addition to one or more of the features described above or below, or as an alternative, further embodiments could include wherein the second selectively tunable module is spaced from the first selectively tunable module along an axis that extends along the support member.

In addition to one or more of the features described above or below, or as an alternative, further embodiments could include wherein the second selectively tunable module is spaced from the first selectively tunable module along an axis that extends substantially orthogonally relative to the support member.

In addition to one or more of the features described above or below, or as an alternative, further embodiments could include a support bracket mounted to the outer surface, the support bracket including a support arm extending substantially parallel to the outer surface, the another selectively tunable element being mounted to the support arm.

In addition to one or more of the features described above or below, or as an alternative, further embodiments could include wherein the selectively tunable element is arranged within the support bracket.

In addition to one or more of the features described above or below, or as an alternative, further embodiments could include a support bracket supporting the selectively tunable element and another support bracket supporting the another selectively tunable element mechanically linked to the support member.

In addition to one or more of the features described above or below, or as an alternative, further embodiments could include wherein the another selectively tunable element is arranged about and radially axially outwardly of the selectively tunable element.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
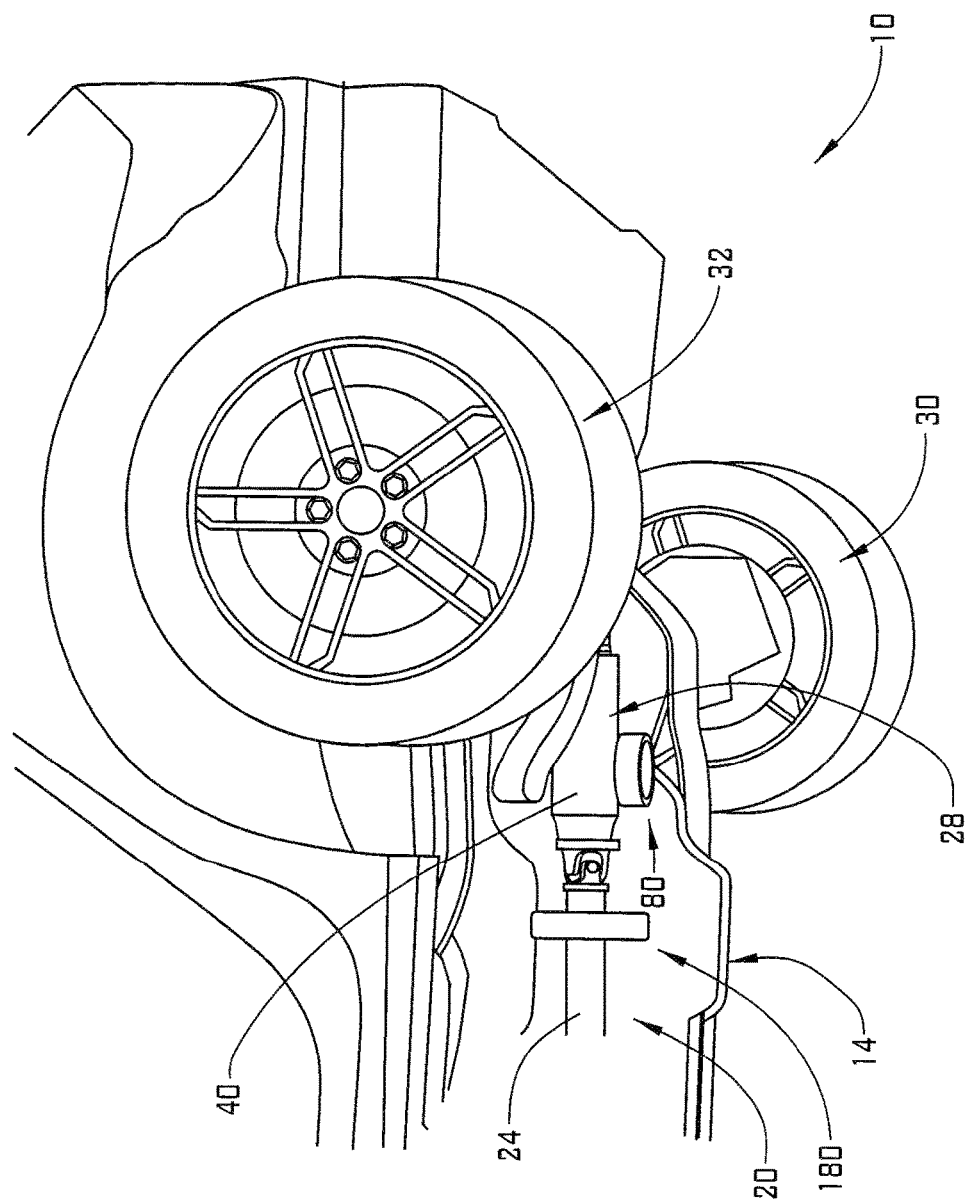
FIG. 1 depicts a portion of a vehicle including a selectively tunable vibration absorber module, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is illustrated generally at 10 in FIG. 1. Vehicle 10 includes a frame 14 that supports a drivetrain, a portion of which is indicated at 20. Drivetrain 20 includes a drive shaft 24 mechanically connected to a differential 28 which, in turn, is mechanically connected to a first wheel 30 and a second wheel 32 through corresponding first and second axles (not shown). In operation, differential 28 may generate undesirable vibrations. Similarly, drive shaft 24 may generate undesirable vibrations. In order to reduce vibrations vehicle 10 includes a selectively tunable vibration absorber 80 that may be connected to a housing 40 of differential 28.

Figure 2:
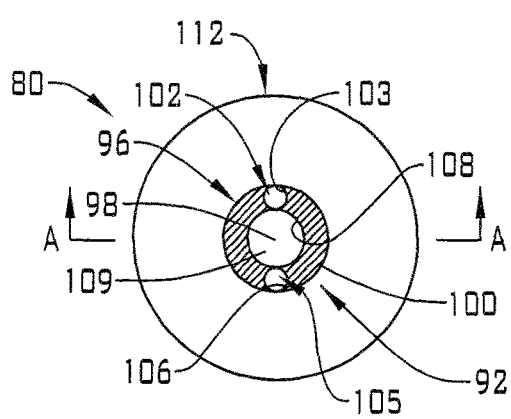
FIG. 2 depicts a selectively tunable vibration absorber module, in accordance with an aspect of an exemplary embodiment.
Figure 3:
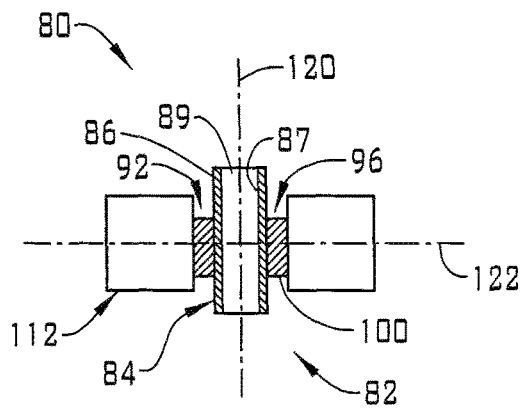
FIG. 3 depicts a cross-sectional view (A-A) of a selectively tunable element and mass of the selectively tunable vibration absorber of FIG. 2, taken through a plane A-A of FIG. 1, in accordance with an aspect of an exemplary embodiment.

As shown in FIGS. 2 and 3, selectively tunable vibration absorber 80 includes a selectively tunable module 82 mounted to a support member 84. Support member 84 includes an outer surface 86 and an inner surface 87 defining a passage 89 that may receive a mechanical fastener (not shown). Selectively tunable module 82 may be connected to a vibrating structure such as housing 40. It is to be understood that support member 84 may also define the vibrating structure. Selectively tunable module 82 includes a selectively tunable element 92 mounted relative to outer surface 86. In accordance with an exemplary aspect, selectively tunable element 92 may be formed from an elastomeric material that may be secured to outer surface 86 through a bonding process including an adhesive, chemical bonding such as vulcanization and or a mechanical/interference fit with support member 84.

Selectively tunable element 92 includes a body 96 having a substantially circular cross-section. Body 96 includes a central void 98 and an outer surface 100. A first tuning feature 102 is arranged in body 96 between central void 98 and outer surface 100. First tuning feature 102 may take the form of a first void 103. A second tuning feature 105 is arranged in body 96 between central void 98 and outer surface 100 spaced radially opposite relative to first tuning feature 102. Second tuning feature 105 may take the form of a second void 106. Selectively tunable element 92 may also include an inner surface 108 defining a central void 109 receptive of support member 84. A mass 112 is supported by selectively tunable element 92. Mass 112 is mounted to outer surface 100 and surrounds selectively tunable element 92.

In accordance with an exemplary aspect, selectively tunable module 82 may absorb or attenuate vibrations in a selected frequency band. The selected frequency band may vary depending on local requirements. Further, selectively tunable module 82 may absorb or attenuate vibrations that occur along a first axis 120 that extends through support member 84 or along a second axis 122 that extends substantially orthogonally to support member 84 through central void 98. Still further, selectively tunable element 92 and mass 112 may absorb or attenuate vibrations in one direction and, if selectively tunable element 92 is reoriented, may absorb or attenuate vibrations in a second direction. The particular direction of absorption and/or attenuation may vary depending upon a particular orientation of first and second tuning features 102 and 105.

Figure 4:
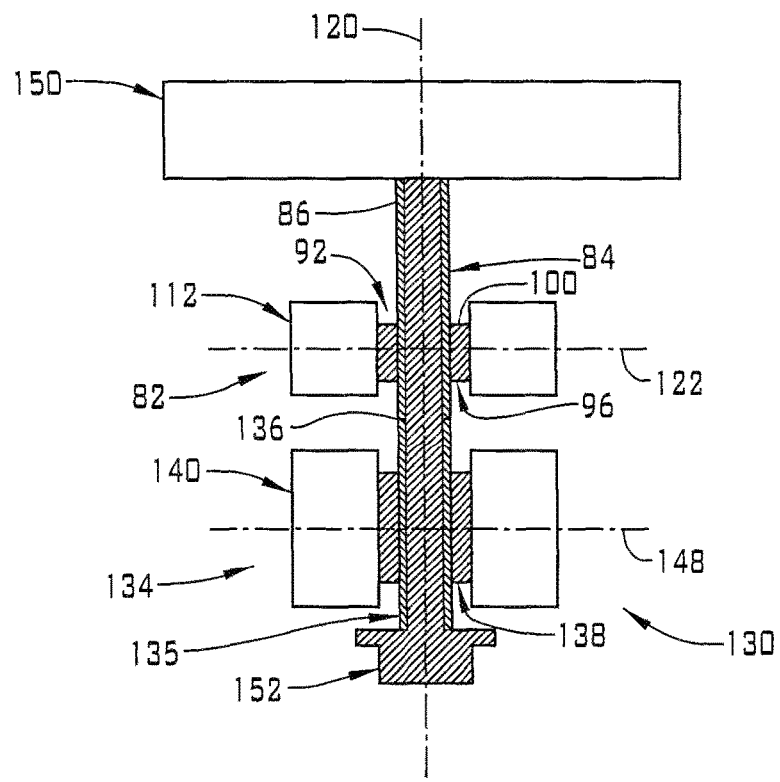
FIG. 4 depicts a cross-sectional end view of a selectively tunable vibration absorber, in accordance with another aspect of an exemplary embodiment.

Reference will now follow to FIG. 4, wherein like reference numbers represent corresponding parts in the respective views, in describing a selectively tunable vibration absorber 130, in accordance with another aspect of an exemplary embodiment. Selectively tunable vibration absorber 130 includes selectively tunable module 82 mounted to support member 84 and another or second selectively tunable module 134 that may be mounted to another support member 135 adjacent selectively tunable module 82 at an interface 136. Of course, it should be understood that another selectively tunable module 134 may be spaced from selectively tunable module 82 along support member 84. It should also be understood that selectively tunable module 82 and selectively tunable module 134 could be mounted to the same support member.

Another selectively tunable module 134 includes another selectively tunable element 138 coupled to another support member 135 and supports a second mass 140. Another selectively tunable element 138 includes third and fourth tuning features (not shown) that may be oriented similar to first and second tuning elements 102 and 105 or along a different axis so as to attenuate vibrations along first axis 120 or along another axis 148 depending upon desired vibration attenuation. Another selectively tunable module 134 is spaced from selectively tunable module 82 along first axis 120.

In accordance with the exemplary aspect shown, selectively tunable vibration absorber 130 is mounted to a vibrating member 150 and may be secured through a mechanical fastener, such as indicated at 152, that extends through support member 84 and another support member 135. Vibrating member 150 may take on a variety of forms including vehicle structure, machine components, and the like. In accordance with an exemplary aspect, selectively tunable module 82 may define a high frequency absorbing module, and another selectively tunable module 134 may define a low frequency absorbing module.

For example, selectively tunable module 82 may be configured to absorb and/or attenuate vibrations in a first frequency range and another selectively tunable module 134 may be configured to absorb and/or attenuate vibrations in a second, lower, frequency range. For example, the first frequency range may represent a high frequency range between about 200 Hz and about 800 Hz and the second frequency range may be a low frequency range between about 20 Hz and about 200 Hz. In this manner, when mounted in, for example, a vehicle, selectively tunable vibration absorber 130 may absorb and/or attenuate vibrations developed in a prime mover and vibrations developed in a gear train.

Figure 5:
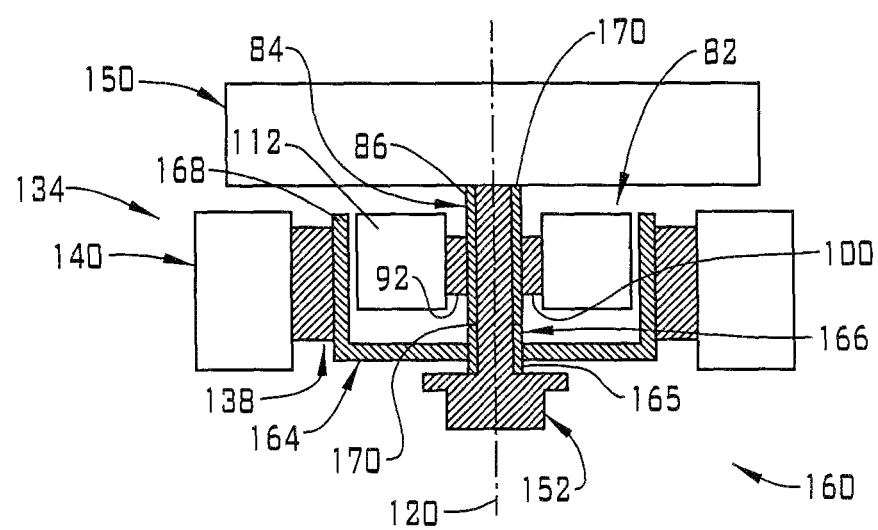
FIG. 5 depicts a cross-sectional end view of a selectively tunable vibration absorber, in accordance with yet another aspect of an exemplary embodiment.

Reference will now follow to FIG. 5, wherein like reference numbers represent corresponding parts in the respective views, in describing a selectively tunable vibration absorber 160, in accordance with another aspect of an exemplary embodiment. Selectively tunable vibration absorber 160 includes a support bracket 164 mounted to an outer surface 165 of support member 166. Support bracket 164 incudes a support arm 168 that may be supported on another support member 166 abutting selectively support member 84 at an interface 170. Of course, support bracket 164 may be spaced from selectively tunable module 82 along support member 84.

Another selectively tunable element 138 and second mass 140 may be coupled to first support arm 168. More specifically, another selectively tunable element 138 may include another support member 172 that is receptive of support arm 168. In this configuration, selectively tunable module 82 and another selectively tunable module 134 may absorb and/or attenuate vibrations across multiple frequency ranges, in similar to distinct directions, while maintaining prescribed packaging needs.

Figure 6:
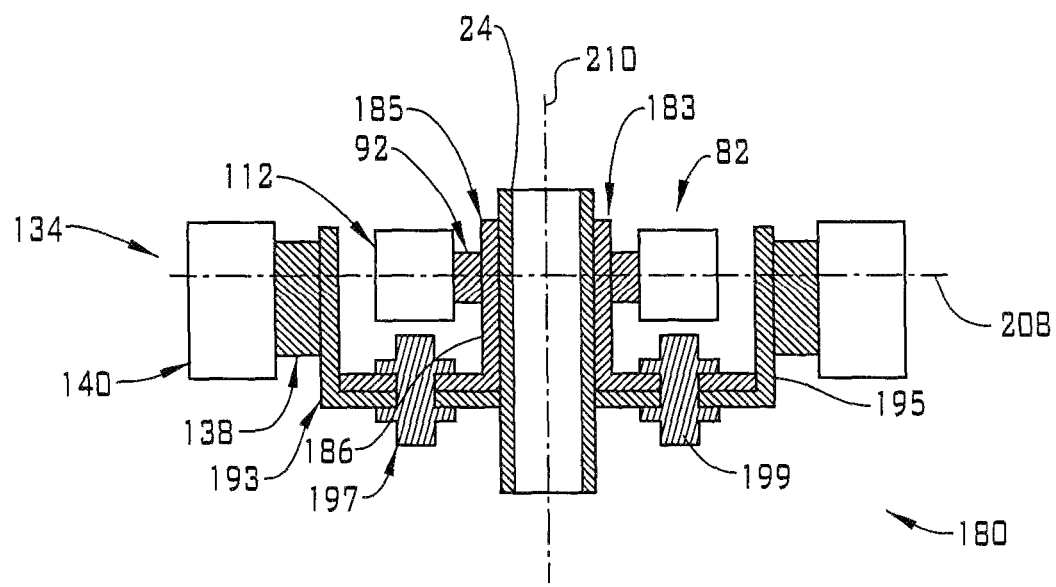
FIG. 6 depicts a cross-sectional end view of a selectively tunable vibration absorber, in accordance with still yet another aspect of an exemplary embodiment.

Reference will now follow to FIG. 6, wherein like reference numbers represent corresponding parts in the respective views, in describing a selectively tunable vibration absorber 180, in accordance with another aspect of an exemplary embodiment. Selectively tunable vibration absorber 180 includes a support member 183 defining a support bracket 185 including an outer surface 186 supporting selectively tunable module 82. Another support bracket 193 including an outer surface 195 supporting another selectively tunable module 134 is coupled to support bracket 185. Support bracket 185 may be mounted to drive shaft 24, see also FIG. 1. Another support bracket 193 is mounted to support bracket 185 through one or more mechanical fasteners 197 and 199.

In operation, drive shaft 24 may oscillate along axis 208. Selectively tunable module 82 and another selectively tunable module 134 may absorb and/or attenuate torsional vibrations about an axis 210 or translational along axis 208 that is substantially orthogonal to drive shaft 24. Selectively tunable vibration absorber 180 may absorb and/or attenuate vibrations that occur in multiple frequency bands while accommodating prescribed packaging needs.

It is to be understood that the selectively tunable vibration absorber, in accordance with exemplary embodiments, may be employed to absorb and/or attenuate vibrations that occur in multiple frequency bands. Absorbing and/or attenuating vibrations in a frequency band may be tuned by the use of various materials in forming selectively tunable elements. Further, an orientation of absorption may be tuned by selectively locating tuning features associated with each of the selectively tunable elements. Finally, while shown with one or two selectively tunable modules, it is to be understood that the number, size and relative positioning of selectively tunable modules may vary.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the exemplary embodiments not be limited to the particular embodiments disclosed, but will include all embodiments falling within the scope of the application.

What is claimed is:

1. A selectively tunable vibration absorber comprising:
   a support member including an outer surface;
   a selectively tunable element mounted relative to the outer surface of the support member, the selectively tunable element being selectively adjustable to attenuate vibrations in a selected frequency range perceived by the support member in a selected direction, wherein the selectively tunable element includes a body having a substantially circular cross-section having a central void, a first tuning feature is formed in the body radially spaced from the central void in a first direction and a second tuning feature is formed in the body radially spaced from the central void in a second direction, the second direction being substantially opposite of the first direction; and
   a mass supported by the selectively tunable element.

2. The selectively tunable vibration absorber according to claim 1, wherein the selectively tunable element is formed from an elastomeric material.

3. The selectively tunable vibration absorber according to claim 1, wherein the first tuning feature comprises a first void formed in the body and the second tuning feature comprises a second void formed in the body.

4. The selectively tunable vibration absorber according to claim 1, wherein the support member includes an inner surface defining a passage receptive of a mechanical fastener.

5. The selectively tunable vibration absorber according to claim 1, further comprising:
   another selectively tunable element mounted adjacent to the selectively tunable element, the another selectively tunable element being selectively adjustable to attenuate vibrations in another selected frequency range perceived by the support member in another selected direction; and
   another mass supported by the another selectively tunable element.

6. The selectively tunable vibration absorber according to claim 5, wherein the another selected direction is distinct from the selected direction.

7. The selectively tunable vibration absorber according to claim 5, wherein the selectively tunable element defines a first selectively tunable module and the another selectively tunable element defines a second selectively tunable module.

8. The selectively tunable vibration absorber according to claim 7, wherein the first selectively tunable module defines a high frequency absorbing module attenuating frequencies in a range between about 200 hz and about 800 hz, and the second selectively tunable module defines a low frequency absorbing module attenuating frequencies in a range between about 20 hz and about 200 hz.

9. The selectively tunable vibration absorber according to claim 7, wherein the second selectively tunable module is spaced from the first selectively tunable module along an axis that extends along the support member.

10. The selectively tunable vibration absorber according to claim 7, wherein the second selectively tunable module is spaced from the first selectively tunable module along an axis that extends substantially orthogonally relative to the support member.

11. The selectively tunable vibration absorber according to claim 5, further comprising a support bracket mounted to the outer surface of the support member, the support bracket including a support arm extending substantially parallel to the outer surface, the another selectively tunable element being mounted to the support arm.

12. The selectively tunable vibration absorber according to claim 11, wherein the selectively tunable element is arranged within the support bracket.

13. The selectively tunable vibration absorber according to claim 5, further comprising a support bracket supporting the selectively tunable element and another support bracket supporting the another selectively tunable element mechanically linked to the support member.

14. The selectively tunable vibration absorber according to claim 13, wherein the another selectively tunable element is arranged about and radially axially outwardly of the selectively tunable element.

* * * * *